United States Patent [19]

Schön et al.

[11] 4,360,195

[45] Nov. 23, 1982

[54] DEVICE FOR ALIGNING AND FEEDING AN ORIGINAL

[75] Inventors: Klaus-Peter Schön; Klaus Schmitt, both of Wiesbaden, Fed. Rep. of Germany

[73] Assignee: Hoechst Aktiengesellschaft, Frankfurt am Main, Fed. Rep. of Germany

[21] Appl. No.: 209,968

[22] Filed: Nov. 24, 1980

[30] Foreign Application Priority Data

Nov. 28, 1979 [DE] Fed. Rep. of Germany ....... 2947865

[51] Int. Cl.³ .......................... B65H 5/10; B65H 9/16; B65H 9/20
[52] U.S. Cl. ....................................... 271/3; 271/227; 271/236; 271/251; 271/267; 271/195; 355/76
[58] Field of Search ............... 271/227, 228, 251, 236, 271/245, 267, 268, 194, 195, 314, 3; 355/76

[56] References Cited

U.S. PATENT DOCUMENTS

| Re. 27,976 | 4/1974 | Sahley | 271/268 X |
|---|---|---|---|
| 1,868,381 | 7/1932 | Buettner . | |
| 3,330,556 | 7/1967 | Sarka | 271/195 X |
| 3,901,594 | 8/1975 | Robertson | 271/3 X |
| 3,908,986 | 9/1975 | Bleau | 271/236 X |
| 4,023,791 | 5/1977 | Hori et al. | 271/3 |
| 4,033,694 | 7/1977 | Ferrari | 355/76 |
| 4,052,054 | 10/1977 | Cardwell et al. | 271/227 |
| 4,171,131 | 10/1979 | Stange et al. | 271/236 |

FOREIGN PATENT DOCUMENTS

| 2523986 | 1/1976 | Fed. Rep. of Germany . |
|---|---|---|
| 2610480 | 9/1976 | Fed. Rep. of Germany . |
| 2712143 | 10/1977 | Fed. Rep. of Germany . |
| 2438483 | 6/1978 | Fed. Rep. of Germany . |
| 2758044 | 7/1978 | Fed. Rep. of Germany . |
| 1532570 | 11/1978 | United Kingdom . |

OTHER PUBLICATIONS

Lennon, K. A. et al., "Sheet Positioning Apparatus," *IBM Tech. Disc. Bull*, vol. 17, No. 10, Mar. 1975, p. 2971.
Cralle, W. O. et al., "Sheet Alignment Sensing Station," *IBM Tech. Disc. Bull.* vol. 17, No. 9, Feb. 1975, p. 2675.

*Primary Examiner*—Bruce H. Stoner, Jr.
*Attorney, Agent, or Firm*—Schwartz, Jeffery, Schwaab, Mack, Blumenthal & Koch

[57] ABSTRACT

The invention relates to a semi-automatic aligning and feeding device (1) for copiers, for the purpose of aligning an original (25) and feeding it from a feed table (17) to an object stage (5). Sensors ($L_1$ to $L_5$) are provided for scanning the original in various positions. Except for one sensor ($L_2$), the sensors are located in or on the pivotable cover (3) of the device. The original, laid by hand onto the feed table (17), is picked up by a suction bar (11) which is equipped with spring suction heads (12, 12') and is, corresponding to its particular operating state, supplied either with vacuum or with compressed air and can be moved from a starting position into an end position and back again. In the end position, the spring suction heads are supplied with compressed air so that the original is laid down in precise alignment on the object stage.

8 Claims, 3 Drawing Figures

DEVICE FOR ALIGNING AND FEEDING AN ORIGINAL

BACKGROUND OF THE INVENTION

The present invention relates to a device for aligning and feeding an original from a feed table to an object stage of a copier, and more specifically to such a device having a drivable feed roller which is located in one corner of the feed table obliquely to the direction of transport of the original, and sensors for scanning the original in various positions and for triggering a transport movement of the original. One of these sensors briefly drives the feed roller via a control system when it detects the presence of an original. The device also has a registering straight-edge which can be moved out of the transport path of the original.

A device of this type for aligning and feeding originals in a copier has been disclosed by German Offenlegungsschrift No. 2,712,143, by means of which two originals, which are aligned side by side next to each other, can be fed from a feed station to the object stage with the scanning station of a copier, the two originals individually being laid down one after the other onto the feed station by the operator.

Semi-automatic feeding of individual originals is described in U.S. Pat. No. 3,908,986. In semi-automatic feeding of originals, the originals are manually laid down onto a feed station, and only the feeding to the object stage takes place automatically, in contrast to completely automatic feeding of originals, in which a stack of originals or artwork is laid down into a supply compartment and then the stacked originals are individually conveyed one after the other by machine from the stack to the feed station and from there to the object stage. In the known semi-automatic feeding device, the individual originals, which are laid down individually onto the feed station, are gripped by an aligning device, are aligned and, as the result of control actions by the machine, are gripped by the transport device and pushed forward onto the object stage for copying or scanning.

In the known semi-automatic feeding devices, as in the devices according to U.S. Pat. No. 4,023,791, German Offenlegungsschrift No. 2,758,044 and German Auslegeschrift No. 2,438,483, the transport devices consist of transport belts and transport rollers. In these devices, due to differences in friction and due to fluctuations in the layer thicknesses or in the diameter of the transport rollers, offsets of the original occur time and again during the movement over the object stage. Due to this incorrect or non-aligned positioning of the original on the object stage, copies are then obtained in which the image is laterally offset at an angle relative to the edges, and the copies therefore cannot be used.

German Offenlegungsschrift No. 2,610,480 discloses a sheet-feeding device for a facsimile system or a similar system, which has a suction device with a suction pad which is brought into contact with the stack of sheets. A contact pressure part is carried by the suction pad and surrounds the latter, one end of the contact pressure part projecting beyond one end of the suction pad. In this sheet-feeding device, air is blown against the edges of the sheets in the stack and a suction force is exerted via the suction pad, or via several suction pads, in order to pick up the top sheet of the stack in this way. There is no aligning and positioning of the sheet during pick-up, or during laying-down after the transport step.

SUMMARY OF THE INVENTION

It is therefore an object of the present invention to provide an improved device for aligning and feeding an original in a copying machine.

It is also an object of the present invention to provide such a device, by means of which exact positioning of the original on the feed table, transport of the original to the object stage without misalignment and precise laying-down of the original at a predetermined point on the object stage take place automatically, without it being necessary to align the original exactly by hand when it is laid down on the feed table.

In accomplishing the foregoing objects, there has been provided in accordance with the present invention a device for aligning and feeding an original from a feed station to an object stage in a copying machine, comprising a cover positioned above at least a portion of the feed station and the object stage; a drivable feed roller associated with the cover in a position above the feed station to feed an original inserted onto the feed station, this feed roller being rotatable about an axis which is obliquely oriented with respect to the direction of transport of the original through the copying machine; a plurality of sensors for detecting a plurality of positions of the original in the copying machine, including a first sensor for detecting the presence of an original in the feed station; means for correctly aligning a leading edge and a leading corner of an original in the feed station, the aligning means including a front edge alignment member which is selectively movable into and out of the transport path of the original; means for temporarily driving the feed roller in response to detection of an original by the first sensor, to feed the original into correct alignment in the aligning means; a transport device for an original, located in the cover, this transport device being movable between a first position located above the aligning means and a second position located above the object stage and including means for selectively and alternately supplying to the transport device a vaccum and positive air pressure, means for gripping an original by suction produced by the vacuum when the original is correctly aligned at the aligning means, and means for moving the transport device between the first and second positions; a second means for detecting when an original is correctly aligned there; and means, responsive to a signal from the second sensor, for moving the front edge alignment member out of the transport path of the original.

In a preferred embodiment, the device further comprises a third sensor for detecting when the transport device is in the first position, a fourth sensor for detecting when the transport device is in the second position and a fifth sensor for detecting when the original has been discharged from the object stage. The third, fourth and fifth sensors are located in the cover.

Further objects, features and advantages of the present invention will become apparent from the detailed description of preferred embodiments which follow, when considered together with the attached figures of drawing.

BRIEF DESCRIPTION OF THE DRAWINGS

Details and the mode of action of the device according to the invention can be seen from the description of a preferred illustrative embodiment which is represented in the figures in which.

DETAILED DESCRIPTION OF PREFERRED EMBODIMENTS

According to the invention, the transport of the original from the feed table to the object stage is effected by means of a transport device which can be subjected to the action of vacuum and compressed air. This transport device is mounted together with the feed roller in a cover and is movable back and forth above the feed table and the object stage. After the original has been laid down on the feed table by the operator, the feed roller automatically aligns the original at the correct angle in one registering corner, before the transport device sucks up the leading edge of the original by means of suction air and moves it in the direction of the object stage. The exact positioning and aligning of the original are effected by sensors, fitted in and on the cover and associated with the feed roller and the transport device, and by a sensor for the registering straight-edge which can be lowered out of the plane of transport, and the exactly aligned original is moved by the transport device to its laying-down point on the object stage. Since the original is held firmly by means of suction air during transport, neither a dislocation nor an offset are possible while the original is being laid down on the object stage. The result of this is that every original rests in exact alignment on the object stage so that the copies made from the original do not have any offsets, and hence the number of copies which have to be discarded because they have offset defects becomes zero.

Figure 1:
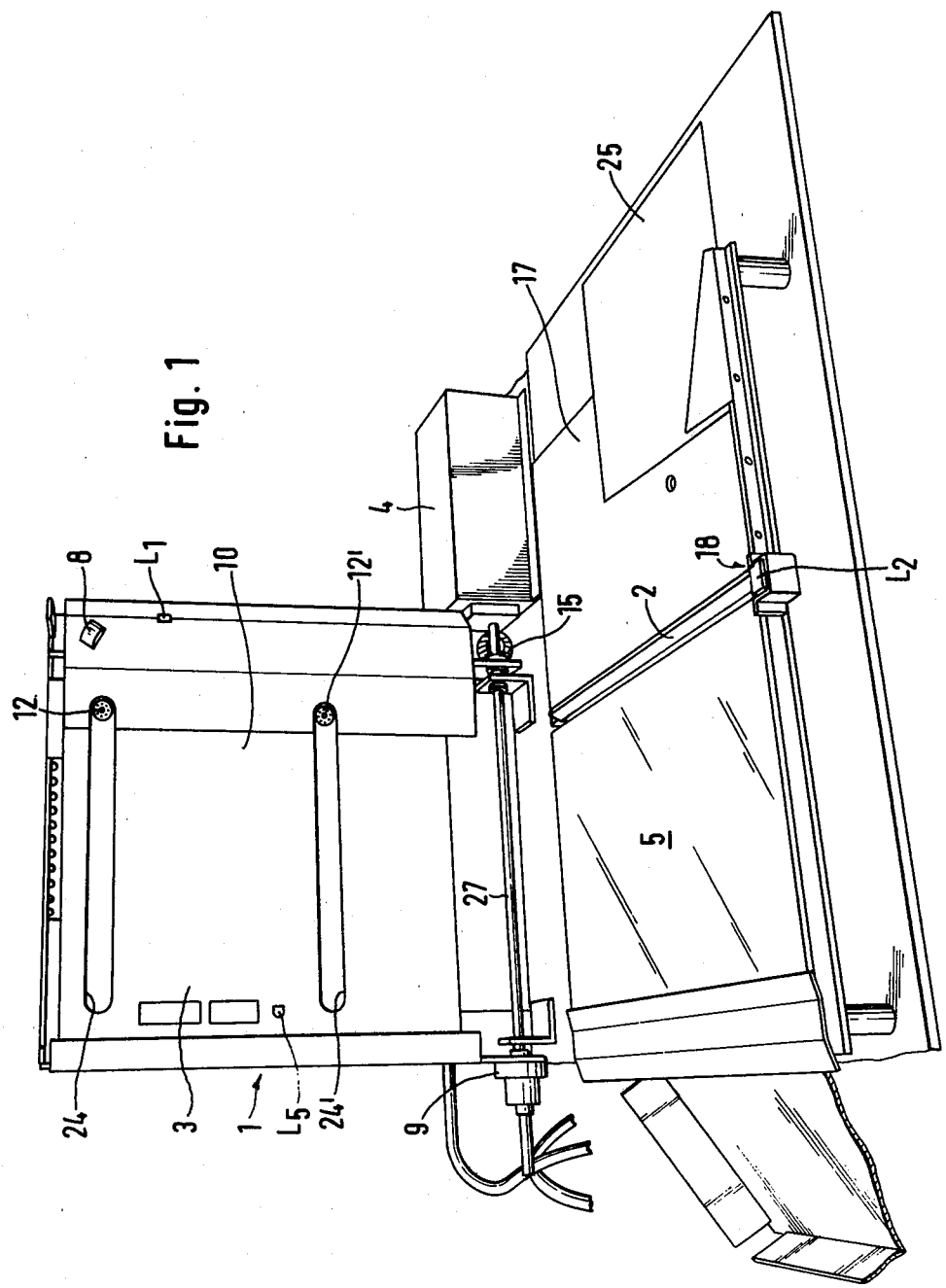
FIG. 1 is a perspective plan view of a preferred illustrative embodiment of the device according to the invention, with the cover tilted away from the feed table and the object stage.

Turning now to the drawings, FIG. 1 shows a perspective plan view of a preferred illustrative embodiment of the semi-automatic aligning and feeding device, the cover 3 of which is tilted up. An original 25 is laid down by an operator onto feed table 17 and is moved in the direction of object stage 5 adjacent to the feed table 17. A first sensor $L_1$, for example, a reflected-infrared light barrier located on the end face of the cover, detects the leading edge of the original 25 and, by its signal, triggers motor 6 which sets feed roller 8 in rotation. The feed roller 8 is arranged at an angle to the transport direction of the original 25, close to one of the front corners of the cover 3. The feed roller 8 transports the original 25 until it strikes a registering straight-edge 2 and a registering corner 18. A second sensor $L_2$ is located in the zone of the registering straight-edge 2 and a third sensor $L_3$ is located in the zone of the registering corner 18. The sensors $L_2$ and $L_3$ establish whether the original 25 has assumed the correct position, that is to say, whether it is in flush contact with the straight-edge 2 and the corner 18. If the original 25 is in the exact position, the pusles of the sensors $L_2$ and $L_3$ initiate an action of lowering the straight-edge 2, which is located between the object stage 5 and the feed table 17, to a level below the feed table or the object stage.

In the interior of the cover 3, a transport device is located (FIG. 2), which consists of a suction bar 11 and spring suction heads 12, 12' which are fixed to the two ends of the suction bar 11. Suction heads 12, 12' are conventional devices sold by MABEG, Maschinenbau GmbH of Offen/Main, West Germany, under the part number 1045A-7591. The suction bar 11 can be moved back and forth in the direction of transport of the original 25. As FIG. 1 shows, the underside of the cover 3 is closed off by a facing 10 in which there are two guide slots 24, 24' for the spring suction heads 12, 12'. A white-matted sheet can be provided as the facing 10. The spring suction heads 12, 12' are connected via a vacuum line 7 to a vacuum and pressure source 26. When the spring suction heads 12, 12' are subjected to a vacuum, they move toward the original 25, jump back into their starting position as soon as the vacuum has been built up, and thus lift the original off the support surface of the feed table 17.

Figure 2:
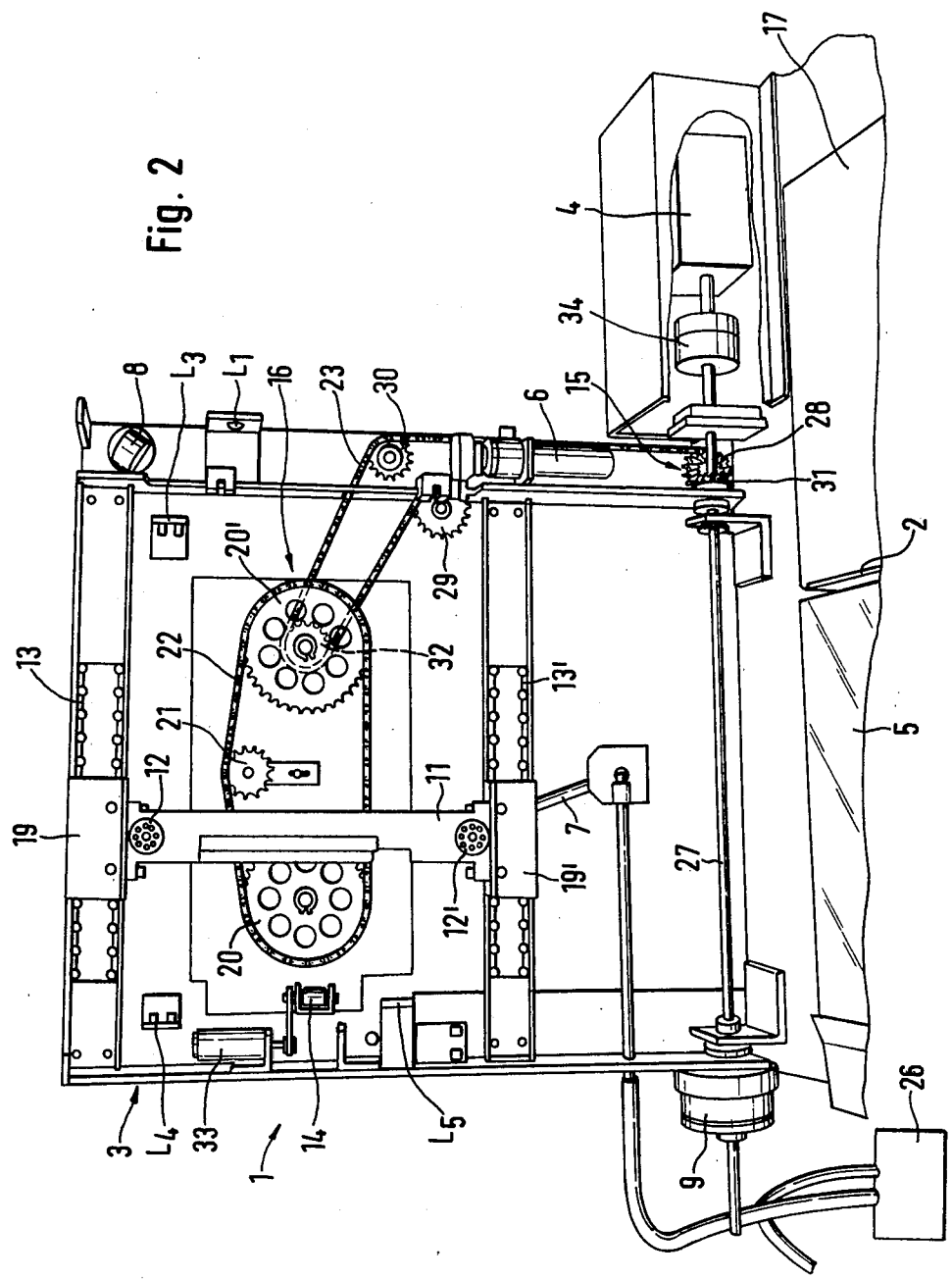
FIG. 2 is a perspective plan view of the cover portion of the device according to FIG. 1, with the facing of the tilted-up cover removed.

For the transport of the suction bar 11, its ends are provided with slide carriages 19, 19' which can be moved along linear ball guides 13, 13' (FIG. 2). For this purpose, a chain drive including a miter gear unit 15 and a transport gear unit 16 is provided. These gear units are driven by a main motor 4 which is fitted to one narrow side of the feed table 17 and the output shaft 27 of which is aligned parallel to the transport direction of the original 25. The end of the drive shaft 27, remote from the main motor 4, carries a brake 9.

The transport gear unit 16 consists of two guide sprockets 20, 20', a tensioning sprocket 21 and an endless gear chain 22 guided around the tensioning sprocket 21 and the guide sprockets 20, 20'. The guide sprockets 20, 20' and the tensioning sprocket 21 are located on the underside of the top surface of the cover 3 and rotate when driven by the gear chain 22 about axles fixed in the top surface. The transport gear unit 16 is connected to the miter gear unit 15 via an endless gear chain 23 which is guided over sprockets 29, 30 and is deflected by the latter at an angle. Furthermore, the gear chain 23 is guided around a bevel sprocket 28 of the miter gear unit 15, and the bevel sprocket 28 meshes with a bevel gear 31 seated directly on the output shaft 27 of the main motor 4. The gear chain 23 also passes around sprocket 32 which is shown in broken lines in FIG. 2 and which is seated behind the guide sprocket 20' on the axle thereof.

In the waiting position of the original 25, while the latter is in contact with the straight-edge 2 and the registering corner 18 in flush alignment, and still before the straight-edge 2 is lowered, the drive shaft 27 is separated from the main motor 4 by a clutch 34, so that the rotating main motor 4 cannot set the miter gear unit 15 in motion. As soon as the second and third sensor $L_2$ and $L_3$ respectively are activated in this waiting position, the clutch 34 is actuated. This rotates the bevel gear 31 on the output shaft 27 of the main motor 4. The bevel gear 31 is in engagement with the bevel sprocket 28 of the miter gear unit 15 and thus, via the miter gear unit 15, sets the transport gear unit 16 in motion. The latter moves the suction bar 11, with the original 25 sucked up by the spring suction heads 12, 12', in the direction of the screen platen.

The suction bar 11 comes to a stop above a delivery roller 14 which is accommodated in the cover 3 and rests on the glass plate of the object stage 5. As soon as the suction bar 11 has stopped, the spring suction heads 12, 12' are switched over from vacuum to compressed air, and the original 25 is laid down on the stage 5 with the leading edge beneath the delivery roller 14. The exposure process in the copier then follows. As soon as the required number of copies have been made, a pulse from a counter of the copier starts a delivery motor 33 which sets the delivery roller 14 in rotation, whereby the original 25 is transported away from the object stage 5.

As will be described in more detail below, the suction bar 11 with the spring suction heads 12, 12' then returns again into its starting position and is ready for feeding a new original.

Figure 3:
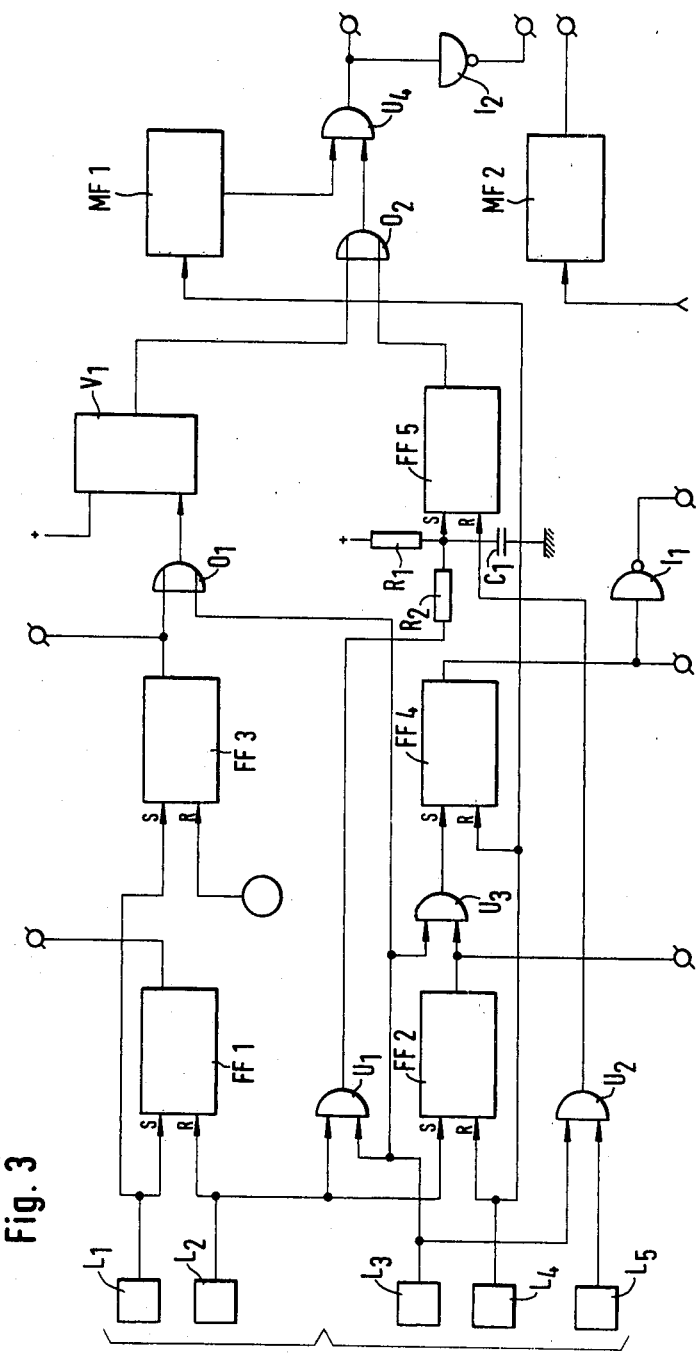
FIG. 3 is a block diagram of the control system for the individual components of the device according to FIGS. 1 and 2.

The circuit arrangement or the electronic logic for controlling the device is described by reference to FIG. 3.

For the control logic, known logic components are used which are run at a stabilized operating voltage of, for example, +15 volt. The operating voltage is applied to the control logic with a time delay, in order to eliminate disturbances due to the copier being switched on. The original 25, inserted by hand, is detected by the first sensor $L_1$ which is a reflected-infrared light barrier. The output of the sensor $L_1$ is connected on the one hand to a first FLIP-FLOP circuit FF1 and, on the other hand, to a third FLIP-FLOP circuit FF3. The output pulse of the sensor $L_1$ causes the first FLIP-FLOP circuit to be triggered. The output of the latter is connected to the motor 6 for actuating the feed roller 8, so that the output signal of the FLIP-FLOP circuit FF1 sets the motor 6 in operation and the feed roller transports the original 25 into the waiting position. In this position, the original 25 interrupts the light beam of the second sensor $L_2$ which, for example, is a forked infrared light barrier which is connected to the first FLIP-FLOP circuit FF1, a first AND-GATE circuit $U_1$ and a second FLIP-FLOP circuit FF2. The output signal of the sensor $L_2$ causes the first FLIP-FLOP circuit FF1 to be reset, whereby the feed roller is stopped. Furthermore, the second FLIP-FLOP circuit FF2 is triggered, and its output is connected to the actuating mechanism (not illustrated) of the registering straight-edge 2. The output signal of the second FLIP-FLOP circuit FF2 thus tilts the straight-edge 2 downwardly, so that the transport path of the original 25 in the direction of the object stage 5 is freed. The output signal of the sensor $L_2$ is also applied to the first AND-GATE circuit $U_1$.

When the second FLIP-FLOP circuit FF2 is triggered and the suction bar 11 in a waiting position activates a third sensor $L_3$, the output of which is connected to the first AND-GATE circuit $U_1$, to a first OR-GATE circuit $O_1$ and to a second AND-GATE circuit $U_2$, the signals of the second sensor $L_2$ and of the third sensor $L_3$ are applied to the input side of the first AND-GATE circuit $U_1$, so that this gate circuit $U_1$, which is connected via a timing element $R_1$, $R_2$, $C_1$ to a fifth FLIP-FLOP circuit FF5, is connected through.

In addition, the sensor $L_3$ is also connected to a third AND-GATE circuit $U_3$. The other input of this AND-GATE circuit $U_3$ is connected to the output of the second FLIP-FLOP circuit FF2. The output of a fourth sensor $L_4$ is connected to the input side of the second FLIP-FLOP circuit FF2, to the fourth FLIP-FLOP circuit FF4 and to a first monostable multivibrator MF1. When the second FLIP-FLOP circuit FF2 is triggered and the suction bar 11 is in the waiting position at the third sensor $L_3$, the output signal of the third sensor $L_3$ and the output signal of the second FLIP-FLOP circuit FF2 switch the third AND-GATE circuit $U_3$ into through connection so that the fourth FLIP-FLOP circuit FF4 is triggered. The output signal of this FLIP-FLOP circuit FF4 controls the vacuum for the spring suction heads 12, 12' and opens a vacuum valve, which is not shown, in the vacuum line 7, whereby the spring suction heads 12, 12' on the suction bar 11 are subjected to a vacuum and suck up the leading edge of the original 25. Simultaneously with opening the vacuum valve, a pressure valve is closed which, in the opened state, supplies the spring suction heads 12, 12' with compressed air. The fifth FLIP-FLOP circuit FF5 is connected via a second OR-GATE circuit $O_2$ and a fourth AND-GATE circuit $U_4$ to the clutch 9 in order to set the miter gear unit 15 and the transport gear unit 16 in motion for the purpose of moving the suction bar 11. The suction bar 11 is then moved in the direction of the fourth sensor $L_4$, for example, a light barrier. As soon as the sensor $L_4$ is activated by a small lug fixed to the suction bar 11, the output pulse of the sensor $L_4$ resets the second FLIP-FLOP circuit FF2 and the fourth FLIP-FLOP circuit FF4, whereby the registering straight-edge 2 is raised again and the vacuum valve in the vacuum line 7 is closed. At the same time, the compressed air valve is opened via the first inverter $I_1$ and compressed air is supplied to the spring suction heads 12, 12' on the suction bar 11. At the same time, the first monostable multivibrator MF1 is also triggered, and the latter emits an output pulse, limited in time, via the fourth AND-GATE circuit $U_4$ to the brake 9 and the clutch 34, by means of which the output shaft 27 of the main motor 4 is declutched and braked. Corresponding to the time-limited duration of the output pulse of the monostable multivibrator MF1, the transport of the original 25 is switched off during this period of time. In the meantime, the original 25 is detached from the spring suction heads 12, 12' by the compressed air and is laid down on the glass plate of the object stage 5. Due to the laying-down of the original 25, the fifth sensor $L_5$, for example, a reflected-infrared light barrier, is activated and the output signal of the fifth sensor $L_5$ is passed to the second AND-GATE circuit $U_2$. If an output signal of the third sensor $L_3$ is applied simultaneously to this gate circuit $U_2$, the second AND-GATE circuit $U_2$ is connected through and resets the fifth FLIP-FLOP circuit FF5 back into the position in which no output signal of the FLIP-FLOP circuit FF5 passes to the second OR-GATE circuit $O_2$, so that the clutch 34 is not engaged and transport thus does not take place.

After the preset time of the first monostable multivibrator MF1 has elapsed, the fourth AND-GATE circuit $U_4$ is released, that is to say, it is connected through, so that the clutch 34 is excited, the brake 9 is switched off and transport takes place, by means of which the suction bar 11 is moved into its starting position in the direction of the third sensor $L_3$. The output of the fourth AND-GATE circuit $U_4$ is connected, on the one hand, to the "Transport" terminal and, on the other hand, via a second inverter $I_2$ to the "Brake" terminal. During the resetting of the suction bar 11 in the direction of the third sensor $L_3$, the transport pulse is inverted by the inverter $I_2$ and switches the brake 9 in order to enable the suction bar 11 to be positioned exactly when it reaches its starting position. As soon as the suction bar 11 stops on reaching the third sensor $L_3$, transport is blocked. A further original 25, which has already been inserted, can then be sucked up and transported only after a starting pulse for a second monostable multivibrator MF2 has been fed in by a counter of the copier, which multivibrator MF2 then emits an output signal to the "Delivery" terminal to which the delivery motor 33 for the original 25 is connected. This delivery motor is then set in operation by the output signal of the second monostable multivibrator MF2 and transports the original away from the object stage 5. A new feeding and aligning cycle with an original 25 inserted anew can start only after the original 25 has cleared the fifth sensor $L_5$. the transport is triggered and the suction bar 11 is transported to the third sensor $L_3$. When the device is switched on, the comparator $V_1$ obtains its triggering signal from the first sensor $L_1$ via the third FLIP-FLOP circuit FF3.

The third FLIP-FLOP circuit FF3 can be reset on the input side by a signal coming from the copier, for example, from a counter. The output signal of the FLIP-FLOP circuit FF3 switches the vacuum pump off.

Preferentially, for each switched stage of the control logic there is used a Darlington power transistor in emitter connection. Driving of the power transistor is effected via a series arrangement of a 10 kilo-ohm resistor and an 8.2 volt Zener diode. As already mentioned, reflected-infrared light barriers and forked light barriers are used for the sensors. The reflected-light barriers are followed by a preamplifier.

What is claimed is:

1. A device for aligning and feeding an original from a feed station to an object stage in a copying machine, comprising:
    a cover positioned above at least a portion of the feed station and the object stage;
    a drivable feed roller associated with said cover in a position above the feed station to feed an original inserted onto the feed station, said feed roller being rotatable about an axis which is obliquely oriented with respect to the direction of transport of the original through the copying machine;
    a plurality of sensors for detecting a plurality of positions of the original in the copying machine, including a first sensor for detecting the presence of an original in the feed station;
    means for correctly aligning a leading edge and a leading corner of an original in the feed station, said aligning means including a front edge alignment member which is selectively movable upwardly and downwardly into and out of the transport path of the original;
    means for temporarily driving said feed roller in response to detection of an original by said first sensor, to feed the original into correct alignment in said aligning means;
    a transport device for an original, located in said cover, said transport device being movable back and forth between a first position located above said aligning means and a second position located above the object stage and including means for selectively and alternately supplying to said transport device a vacuum and positive air pressure, means for gripping an original by suction produced by said vacuum when the original is correctly aligned at said aligning means, and means for moving said transport device between said first and second position;
    a second sensor located as said aligning means for detecting when an original is correctly aligned there; and means, responsive to a signal from said second sensor, for moving said front edge alignment member out of the transport path of the original.

2. A device according to claim 1, further comprising a third sensor for detecting when said transport device is in said first position, a fourth sensor for detecting when said transport device is in said second position and a fifth sensor for detecting when the original has been discharged from the object stage, said third, fourth and fifth sensors being located in said cover, said means for moving said transport device being operative in response to signals from said third, fourth and fifth sensors.

3. A device according to claim 2, wherein said transport device comprises suction bar and a plurality of spring suction heads mounted on said suction bar for gripping an original in response to a vacuum supplied from said vacuum supplying means.

4. A device according to claim 3, wherein said suction bar includes a slide carriage at each end thereof and said cover includes linear guide members in which said slide carriages are movably carried.

5. A device according to claim 2, wherein said means for moving said transport device include a first AND-circuit having its input adapted to receive an output signal from each of said second and third sensors, a first FLIP-FLOP circuit having its input adapted to receive an output signal from said first AND-circuit, a drive motor, a rotating output shaft from said motor, a drive shaft, a clutch activated by an output signal from said first FLIP-FLOP circuit and adapted upon activation to couple said drive shaft to said drive motor output shaft and a chain drive mechanism for moving said suction bar from said drive shaft.

6. A device according to claim 5, further comprising an original delivery roller positioned above the object stage and below said second position of said suction bar, and means responsive to positioning of said suction bar in its second position for supplying positive air pressure to said original gripping means to deliver an original onto the object stage with its leading edge beneath said delivery roller.

7. A device according to claim 5, wherein said chain drive mechanism comprises a transport gear unit including two first guide sprockets, a tensioning sprocket and a first endless chain extending about said guide and tensioning sprockets, and a miter gear unit including a bevel gear secured to said drive shaft, a bevel sprocket engaging with said bevel gear, at least one second guide sprocket, a drive sprocket mounted for rotation with one of said first guide sprockets and a second endless chain extending around said bevel sprocket, said second guide sprocket and said drive sprocket.

8. A device according to claim 5, wherein said temporary feed roller driving means comprises a second motor, mounted in said cover, and a second FLIP-FLOP circuit for triggering operation of said second motor in response to an output signal from said first sensor.

* * * * *